March 25, 1969   M. STRASBERG ET AL   3,434,340

METHOD AND APPARATUS FOR OBSERVING MECHANICAL OSCILLATIONS

Filed Aug. 19, 1966

INVENTORS
MURRAY STRASBERG
HUGH M. FITZPATRICK

BY  *JP Hodges*
ATTORNEY

United States Patent Office
3,434,340
Patented Mar. 25, 1969

3,434,340
METHOD AND APPARATUS FOR OBSERVING MECHANICAL OSCILLATIONS
Murray Strasberg, Montgomery County, Md. (3531 Yuma St. NW., Washington, D.C. 20008), and Hugh M. Fitzpatrick, 4709 Merivale Road, Chevy Chase, Md. 20015
Filed Aug. 19, 1966, Ser. No. 574,288
Int. Cl. G01d 7/00
U.S. Cl. 73—71.4    18 Claims

ABSTRACT OF THE DISCLOSURE

A circuit having a sensing element for converting recurring mechanical changes into electrical signals, the sensing element being of the type requiring a driving current. A source of mechanical change of a periodic nature is sensed by the sensing element. The sensing element is driven by a source of current having a frequency which is substantially the same as the frequency of the periodic mechanical change. The electrical output of the sensor is filtered to remove the current having the frequency of the driving current and the residual current is fed to a display device either through a rectifier or directly to a meter or oscillograph.

---

Figure 1:
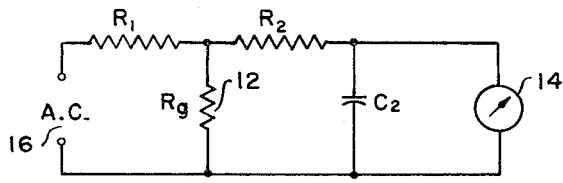

The invention described herein may be manufactured and used by or for the Government of the United States of America for governmental purposes without the payment of any royalties thereon or therefor.

The invention relates to a method and apparatus for detecting or measuring mechanical oscillations, and more particularly relates to a method and apparatus for determining the amplitude and phase of a mechanical oscillatory quantity at some specific frequency or range of frequencies, utilizing a sensor which transforms the mechanical oscillation into an electrical signal.

Examples of the type of sensor employed in conjunction with the present invention are piezoresistive elements, commonly called strain gages, whose electrical resistance varies when the element is stretched; self-inductance and mutual-inductance gages, commonly called differential transformers, whose self or mutual inductance varies with relative displacement; capacitance gages, whose capacitance depends on the separation of the two sides of the capacitor; and thermistors, whose resistance varies with temperature.

The common feature of all these sensing elements is that they require a source of electrical energy, and they produce an electrical output containing a component whose magnitude depends on the product of the magnitude of the electrical input and the magnitude of the oscillating quantity being sensed. Sensors of this type are generally known in the art as "active electromechanical transducers." Such transducers can be used to produce electrical signals in response to various forms of oscillation, such as oscillatory displacement, acceleration, pressure, temperature, etc. It is to be understood that although the principle of the invention can be utilized with sensing elements of various types, such as those listed above, for simplicity the invention will be described in connection with a piezo-resistive element used for measuring strain.

There are primarily two conventional prior art methods for utilizing such strain gage elements. In one method, called "direct-current excitation," a relatively constant direct current is passed through the gage element, and changes in resistance of the element in response to changes in strain result in a fluctuating voltage across the element. In the second method, called "carrier excitation," an alternating current, or carrier, is passed through the gage element, and changes in resistance in response to changes in strain result in amplitude modulation of the carrier voltage across the element. The carrier voltage is then demodulated or rectified to provide a direct-current output which is constant if the strain is constant, or fluctuates if the strain fluctuates. When the oscillatory component of a fluctuating strain is of interest, the demodulator or rectifier output is generally passed through a filter which removes any remaining carrier-frequency from the signal. For proper operation of this filter, and also for proper operation of the demodulator or rectifier, the carrier frequency must be chosen substantially higher than the frequency of any oscillatory strain component of interest.

With either direct-current or carrier excitation, it is common practice to connect the gage element in a bridge circuit so as to balance out most of the voltage existing across the element in the absence of strain.

When only the oscillatory component of strain is of interest, it is common practice to observe the output voltage on an oscillograph or measure its magnitude with a voltmeter responding only to A.C. When it is desired to determine the magnitude of a component of the oscillating strain at one particular frequency only, in the presence of components at other frequencies, it is common to pass the output through a frequency-discriminating device such as a narrow band-pass filter, a wave analyzer, or a spectrum analyzer. Such devices are well known to the art and are commercially available, but they are bulky, expensive, and often can introduce measurement errors.

The present invention eliminates the need of a separate frequency discriminating device for determining the magnitude and phase of an oscillating component of strain at one particular frequency in the presence of components at other frequencies. According to the present invention, the functions of the frequency discriminating device are performed by the strain gage element itself. This is accomplished by a modification of the conventional form of carrier excitation.

Whereas the conventional form of carrier excitation supplies the gage element with a carrier whose frequency is substantially higher than the frequency of the strain component of interest, according to the present invention the carrier frequency is made exactly equal to the frequency of the strain component of interest. This results in a D.C. voltage across the gage element which is then measured directly, without demodulation or rectification. The magnitude of the D.C. voltage is approximately proportional to the magnitude of the oscillating component of strain at the frequency of the carrier.

Accordingly, it is among the objects of the present invention to provide determination of the magnitude and phase of an oscillating component of strain at one particular frequency in the presence of other frequency components.

Another object of the present invention is to eliminate the need of separate frequency discriminating means in the determination of oscillating strain components.

Yet another object of this invention is the provision of a novel strain measuring arrangement wherein the strain gage element itself acts as a frequency discriminator.

A feature of this invention is the provision of a system of direct measurement of direct current voltage across a strain gage element without demodulation or rectification.

For a better understanding of the present invention, reference is made to the accompanying drawings in which like numerals indicate like parts, and in which:

FIGS. 1, 2, 3 and 4 are schematic circuit diagrams of different respective embodiments of the present invention.

Referring to FIG. 1 there is shown a single strain gage element 12 having a resistance indicated as $R_g$ connected to an input resistance $R_1$ through which is supplied from a source 16 an A.C. carrier current. The gage element 12 is also connected to a galvanometer or D.C. voltmeter 14 through a resistor $R_2$. A by-pass capacitor $C_2$ connected across the source 16 and the resistor $R_2$ acts as a low-pass filter preventing the carrier frequency from reaching the D.C. voltmeter 14. The values of $R_2$ and $C_2$ influence the averaging time or time-constant of the D.C. meter 14. The resistance $R_1$ and $R_2$ should preferably be at least as large as the resistance $R_g$ or substantially larger.

If the strain of the gage element has a steady component $B_0$ and oscillating component $B_1$ at radian frequency $\omega_1$, then the instantaneous resistance $R_g$ of the gage element will be given by $$R_g = R_0[1 + B_0 G + B_1 G \cos(\omega_1 t - \theta)]$$

where $R_0$ is the resistance of the gage element 12 in the absence of strain, G is the so-called "gage factor," i.e., the fractional change in resistance per unit of strain, and $\theta$ is a phase angle. The A.C. carrier current through the gage element 12 is given by $$I_g = I_0 \cos \omega_c t$$

where $\omega_c$ is the frequency of the carrier current. Then combining Equations (1) and (2), the instantaneous voltage across the gage element 12 is given by $$E_g = I_g R_g = I_0 R_0([1 + B_0 G] \cos \omega_c t \\ + (\tfrac{1}{2}) B_1 G \cos[(\omega - \omega_c)t - \theta] \\ + (\tfrac{1}{2}) B_1 G \cos[(\omega_1 - \omega_c)t - \theta]$$

The voltage across the gage element 12 is seen to have components at three frequencies: The carrier frequency $\omega_c$, the difference frequency $(\omega_1 - \omega_c)$, and the sum frequency $(\omega_1 + \omega_c)$.

If the carrier frequency is chosen to equal the frequency of the oscillating strain, so that $\omega_c = \omega_1$, then the voltage across the gage element 12 will have a component at zero frequency, i.e., a direct-current component, of magnitude $$(\tfrac{1}{2}) I_0 R_0 B_1 G \cos \theta$$

The D.C. voltage across the gage element 12 is then proportional to the product of the magnitude of the oscillating strain multiplied by the cosine of its phase angle relative to that of the A.C. carrier. Strain components at any frequency different from that of the carrier contribute nothing to the D.C. voltage. In this way, the strain gage element 12 combines the functions of sensing strain and of discriminating frequency.

If the oscillating strain is very small, the D.C. output voltage may be so small that it must be amplified before it is measured. A convenient method of amplification is to convert the D.C. voltage into an A.C. voltage of fixed frequency, e.g., by means of a chopper, and amplify this A.C. voltage in conventional fashion.

Figure 2:
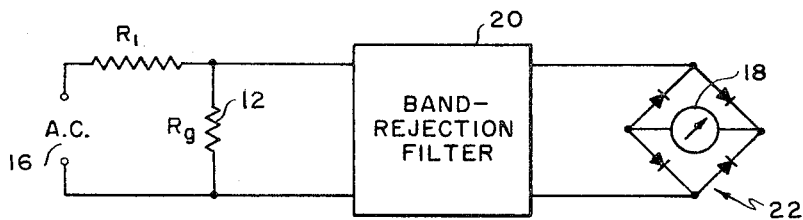

Another form of the invention, shown schematically in FIG. 2, is especially convenient if the oscillating strain fluctuates somewhat in frequency, or if it is desired to determine the oscillating strain components over a band of frequencies rather than at a single frequency. In this form of the invention, a voltmeter 18 capable of measuring both D.C. and relatively low-frequency A.C. voltages is substituted for the D.C. voltmeter shown in FIG. 1. In this form of the invention it is important that the low-pass filter between the gage element and the meter prevent substantially all of the carrier frequency voltage from reaching the meter. To accomplish this, it is desirable to replace the simple filter consisting of $R_2$ and $C_2$ with a better low-phase filter, or a wave trap or band-rejection filter 20 tuned to the carrier frequency. A full-wave rectifier 22 at the output of the low-pass filter permits the meter 18 to respond to low-frequency A.C. as well as D.C. voltage.

If the oscillating strain has a continuous spectrum over the frequency range of interest, it is not necessary to provide response to D.C. The meter 18 responding to low-frequency A.C. can thus be substituted for the D.C. meter shown in FIG. 1. The system will then be sensitive to oscillating strains over a band of frequencies centered at the carrier frequency, the band width being approximately twice the cut-off frequency of the low-pass filter 20.

The form of the invention shown in FIG. 2 can also be used for an oscillating strain component at a single frequency simply by detuning the carrier slightly so that the difference frequency $(\omega_1 - \omega_c)$ is not zero but yet low enough to pass through the low-pass filter.

If the oscillatory strain has components at several frequencies, each of these can be measured separately by the above FIG. 1 and FIG. 2 arrangements, choosing the appropriate carrier frequency for each frequency component of interest. If the oscillatory strain consists of a complex periodic function of time superimposed on random oscillations, each harmonic component of the periodic signal can be measured by employing the appropriate carrier frequency.

Figure 3:
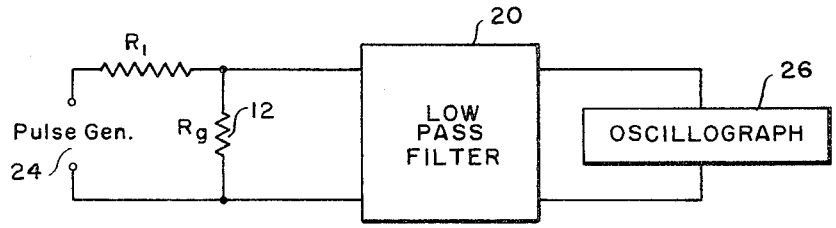

It is also possible to separate the periodic signal from the random oscillations by the arrangement shown in FIG. 3. Instead of employing a single-frequency sinusoid carrier, a pulse generator 24 provides a carrier consisting of periodic short pulses, with a pulse period nearly equal to the period of the strain. The waveform of the output from the low-pass filter 20 will then duplicate the waveform of the periodic component of the strain except that the original strain frequencies will be divided down to frequencies passed by the low-pass filter. This waveform can be observed by passing the output of the filter to an oscillograph 26. The behavior of the system in this mode of operation may be understood by noting that the periodic pulse carrier is equivalent to a set of sinusoidal carriers at the pulse repetition frequency and its harmonics. Each of these harmonic components of the carrier combines with a harmonic of the periodic strain to give difference frequency components which pass through the low-pass filter.

According to the invention either conventional resistance-wire strain gages or semi-conductor piezo-resistive strain gages may be employed as gage elements. If semi-conductor gages are used, these can have a sufficiently large gage factor to permit the use of a sensitive galvanometer in place of the D.C. meter in the circuit shown in FIG. 1. As a specific example of such a circuit, a semi-conductor gage with a gage factor of 100 and a resistance of 500 ohms can be used in combination with a sensitive mirror galvanometer having a coil resistance of 1000 ohms and a deflection factor of $2 \times 10^{-8}$ amperes per millimeter deflection. If $R_1$ is 2000 ohms, $R_2$ is 1000 ohms, and the A.C. carrier input is 40 volts peak, the galvanometer deflection will be about 1 millimeter for an oscillating strain of 10 micro-inch per inch single amplitude. Accordingly, oscillating strains of a magnitude encountered in practice can be measured with the circuit of FIG. 1 without requiring any amplifier.

The principles of the invention can also be applied to strain gage elements in bridge circuits. The D.C. output of the bridge is proportional to the oscillating strain at the carrier frequency. The other forms of the invention previously described can also be applied to bridge circuits in obvious fashion.

Figure 4:
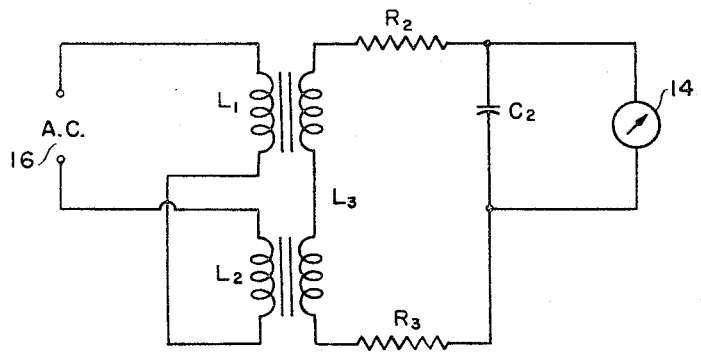

Although the invention has been described in connection with piezo-resistive or strain gage elements, the principles can also be applied to other sensors of the general type described hereinabove. For example, to measure oscillatory temperatures, a thermistor can be substituted for the piezo-resistive element. As another example, FIG. 4 shows how the principle can be applied to a differential transformer. The two halves of a fixed primary coil $L_1$ and $L_2$ are connected to the A.C. source 16. The two halves of the primary coil are balanced so that they induce no net voltage in a movable secondary coil $L_3$ when the secondary coil $L_3$ is in its mean position. Displacement of the secondary coil $L_3$ results in an A.C. voltage across the coil at carrier frequency. Resistors $R_2$ and $R_3$, and a bypass capacitor $C_2$ connected in circuit with the secondary coil $L_3$ act as a low pass filter for the A.C. voltage. The D.C. voltmeter 14 is connected to the secondary $L_3$ through the resistors $R_2$ and $R_3$. If the displacement of the secondary coil $L_3$ produces an oscillatory component at the same frequency as that of the carrier, a D.C. voltage will exist across the secondary.

Obviously many modifications and variations of the present invention are possible in the light of the above teachings. It is therefore to be understood that within the scope of the appended claims the invention may be practiced otherwise than as specifically described.

What is claimed is:
1. The method of converting an oscillating mechanical quantity into a measurable electrical signal comprising the steps of:
    feeding a periodically varying current of the frequency of said mechanical oscillations to an active electromechanical transducer; and
    passing the output of said transducer through a low-pass filter having a cut-off frequency substantially below the frequency of said periodically varying alternating current.
2. The method of determining the amount of strain acting on an active electromechanical transducer at a strain frequency component of interest comprising the steps of:
    feeding an alternating current at the frequency of interest to the active electromechanical transducer;
    passing the output signals produced by the transducer through a low-pass filter having a cut-off frequency substantially below the frequency of said alternating current; and
    measuring the resulting direct current.
3. The method of converting an oscillating mechanical quantity into an electrical signal comprising the steps of:
    feeding periodic pulses to an electromechanical transducer; and
    passing the output of said electro-mechanical transducer through a low-pass filter which has a cut-off frequency substantially below the repetition frequency of said pulses; and
    displaying the output wave form of said filter.
4. Apparatus for converting an oscillating mechanical quantity into an electrical signal comprising:
    an active electromechanical transducer;
    means connected to said transducer for supplying said transducer with alternating current of substantially the frequency of the oscillations of said transducer; and
    output means including a low pass filter connected directly to said active electromechanical transducer for attenuating signals therefrom at the approximate frequency of the alternating current supplied to said transducer.
5. Apparatus according to claim 4 in which said output means further includes signal indicating means responsive to the output of said low pass filter.
6. Apparatus according to claim 5 but further characterized by said signal indicating means comprises a signal level display device.
7. Apparatus according to claim 4 in which said output means includes means for rectifying the output of said low pass filter.
8. Apparatus according to claim 7 in which said output means includes output signal indicating means responsive to the output of said means for rectifying.
9. Apparatus according to claim 4 in which said output means includes means responsive to the alternating current output of said low pass filter for displaying the output signal of said filter.
10. Apparatus according to claim 4 in which said active electromechanical transducer comprises a piezoresistive element.
11. The method of providing an electrical signal representing the amount of strain acting on an active transducer at a strain frequency component of interest comprising the steps of:
    feeding through the transducer a fluctuating current of a frequency at least approximately equal to that of the strain frequency component of interest; and
    attenuating output signals appearing at the output of the transducer at the frequency of said fluctuating current.
12. The method according to claim 11 but further characterized by said fluctuating current being alternating.
13. The method according to claim 11 but further characterized by said fluctuating current being periodic short pulses.
14. An active electromechanical transducer system for use with a device subject to mechanical changes having a changing frequency of interest comprising:
    an electromechanical transducer;
    a source of periodically repetitive current of substantially the same frequency as the mechanical frequency of interest connected to said transducer;
    means connected to the electrical output of said transducer for detecting the direct current component of output signal.
15. A device as claimed in claim 14 in which said means for detecting includes a band rejection filter for rejecting the output signal of the frequency of said source.
16. A device as claimed in claim 14 in which said source is an alternating current source.
17. A transducer system for use with a device subject to recurring mechanical changes comprising:
    an electromechanical transducer for receiving a changing mechanical signal and producing a corresponding electrical signal;
    a source of alternating current connected to said transducer;
    means for detecting a direct current voltage produced when the frequency of the alternating current is substantially the same as the frequency of the signal received by said electromechanical transducer;
    substantially linear circuit means connecting said means for detecting to said transducer.
18. A device as claimed in claim 17 which includes a filter in the output of said transducer for rejecting signals of the frequency of said source.

References Cited

UNITED STATES PATENTS 2,352,219  6/1944  Olesen _____ 73—71.2 XR
2,737,643  3/1956  Marsden _____ 324—71

RICHARD C. QUEISSER, *Primary Examiner.*

JOHN R. FLANAGAN, *Assistant Examiner.*

UNITED STATES PATENT OFFICE
CERTIFICATE OF CORRECTION

Patent No. 3,434,340      Dated March 25, 1969

Inventor(s) Murray Strasberg and Hugh M. Fitzpatrick

It is certified that error appears in the above-identified patent and that said Letters Patent are hereby corrected as shown below:

Column 3, lines 28 to 31, the equation given should appear as follows:

$$E_o = I_g R_g = I_o R_o ([1 + B_o G]\cos \omega_c t$$
$$+ (1/2) B_1 G \cos [(\omega_1 - \omega_c)t - \theta]$$
$$+ (1/2) B_1 G \cos [(\omega_1 + \omega_c)t - \theta])$$

SIGNED AND
SEALED
MAR 10 1970

(SEAL)
Attest:

Edward M. Fletcher, Jr.
Attesting Officer

WILLIAM E. SCHUYLER, JR.
Commissioner of Patents